(12) United States Patent
Broers

(10) Patent No.: US 9,174,806 B2
(45) Date of Patent: Nov. 3, 2015

(54) TRANSFER CONVEYOR AND A CONVEYING SYSTEM

(75) Inventor: Johannes Wilhelmus Broers, Oosterblokker (NL)

(73) Assignee: Specialty Conveyor B.V., Zwagg (NL)

( * ) Notice: Subject to any disclaimer, the term of this patent is extended or adjusted under 35 U.S.C. 154(b) by 113 days.

(21) Appl. No.: 13/992,596

(22) PCT Filed: Dec. 8, 2011

(86) PCT No.: PCT/EP2011/072216
§ 371 (c)(1),
(2), (4) Date: Aug. 9, 2013

(87) PCT Pub. No.: WO2012/076659
PCT Pub. Date: Jun. 14, 2012

(65) Prior Publication Data
US 2014/0291121 A1    Oct. 2, 2014

(30) Foreign Application Priority Data

Dec. 9, 2010    (NL) ..................................... 2005846

(51) Int. Cl.
B65G 37/00    (2006.01)
B65G 47/51    (2006.01)
B65G 47/52    (2006.01)

(52) U.S. Cl.
CPC ............ B65G 37/00 (2013.01); B65G 47/5131 (2013.01); B65G 47/52 (2013.01)

(58) Field of Classification Search
CPC .. B65G 47/5131; B65G 47/52; B65G 21/209; B65G 21/2063
USPC ......... 198/602, 594, 812, 860.3, 836.1, 836.2
See application file for complete search history.

(56) References Cited

U.S. PATENT DOCUMENTS

| 647,404 A | 4/1900 | Hay |
| 1,846,804 A | 2/1932 | Hansen |

(Continued)

FOREIGN PATENT DOCUMENTS

| DE | 1262886 B | 3/1968 |
| DE | 2307728 A1 | 9/1974 |

(Continued)

OTHER PUBLICATIONS

International Search Report and Written Opinion from the European Patent Office mailed Feb. 3, 2012 for corresponding International Application No. PCT/EP2011/072216, filed Dec. 8, 2011.

(Continued)

*Primary Examiner* — William R Harp
(74) *Attorney, Agent, or Firm* — Steven M. Koehler; Westman, Champlin & Koehler, P.A.

(57) ABSTRACT

A transfer conveyor for transferring articles from a first conveyor to a second conveyor comprises an input for receiving articles from the first conveyor and an output for transporting articles to the second conveyor, a first contact member and a second contact member having first and second contact surfaces, respectively, extending upwardly and facing each other for clamping articles between said contact surfaces when travelling from the input to the output and a curved transport path between the input and the output, and a counter member for holding up an article and/or at least one of the first and second contact members in vertical direction when an article is clamped by the contact members. At least one of the first contact member, the second contact member and the counter member is drivable for transporting articles from the input to the output.

22 Claims, 5 Drawing Sheets

(56) References Cited

U.S. PATENT DOCUMENTS

| | | |
|---|---|---|
| 2,078,236 A | 4/1937 | Chapman |
| 3,049,097 A | 8/1962 | Kershaw |
| 3,200,893 A | 8/1965 | Leavell |
| 3,318,439 A | 5/1967 | Sullivan |
| 3,456,741 A | 7/1969 | James |
| 3,547,207 A | 12/1970 | Warrington |
| 3,583,499 A | 6/1971 | Cordes |
| 3,800,548 A | 4/1974 | Wisotsky |
| 3,820,346 A | 6/1974 | Wisotsky |
| 3,970,156 A | 7/1976 | Niskin |
| 4,018,325 A | 4/1977 | Rejsa |
| 4,033,139 A | 7/1977 | Frederick |
| 4,043,405 A | 8/1977 | Kuhn |
| 4,063,632 A | 12/1977 | Neth |
| 4,187,917 A | 2/1980 | Bouyoucos |
| 4,201,286 A | 5/1980 | Meier |
| 4,238,166 A | 12/1980 | Gendron |
| 4,364,465 A | 12/1982 | Kraft et al. |
| 4,367,800 A | 1/1983 | Arentsen |
| 4,401,020 A | 8/1983 | Brux |
| 4,413,724 A | 11/1983 | Fellner |
| 4,469,219 A | 9/1984 | Cosse |
| 4,513,858 A | 4/1985 | Fellner |
| 4,549,647 A | 10/1985 | Cosse |
| 4,601,349 A | 7/1986 | Arentsen |
| 4,718,656 A | 1/1988 | Reist |
| 4,889,223 A | 12/1989 | Bergstrom |
| 4,924,998 A | 5/1990 | Fuller, Jr. |
| 4,944,315 A | 7/1990 | Focke |
| 4,989,718 A | 2/1991 | Steeber |
| 5,067,857 A | 11/1991 | Ward |
| 5,350,050 A | 9/1994 | Franke |
| 5,413,213 A | 5/1995 | Golz et al. |
| 5,417,317 A | 5/1995 | Kalinich |
| 5,490,589 A | 2/1996 | Golz et al. |
| 5,636,723 A | 6/1997 | Bulle et al. |
| 5,690,463 A | 11/1997 | Yoshie |
| 5,772,005 A | 6/1998 | Hansch |
| 5,845,765 A | 12/1998 | Gram |
| 5,903,464 A | 5/1999 | Stingel, Jr. et al. |
| 6,026,947 A | 2/2000 | Peterson |
| 6,059,096 A * | 5/2000 | Gladieux ............... 198/836.3 |
| 6,152,291 A | 11/2000 | Steeber et al. |
| 6,182,812 B1 | 2/2001 | Hartness, III et al. |
| 6,230,874 B1 | 5/2001 | Steeber et al. |
| 6,241,074 B1 | 6/2001 | Steeber |
| 6,260,688 B1 | 7/2001 | Steeber et al. |
| 6,334,528 B1 | 1/2002 | Bogle et al. |
| 6,533,103 B2 | 3/2003 | Hartness et al. |
| 6,612,420 B1 | 9/2003 | Hartness et al. |
| 6,713,107 B2 | 3/2004 | Shefet et al. |
| 6,725,998 B2 | 4/2004 | Steeber et al. |
| 7,021,452 B2 | 4/2006 | Horton et al. |
| 7,823,718 B2 * | 11/2010 | Spencer ................... 198/594 |
| 8,042,676 B2 | 10/2011 | Balk |
| 2003/0178284 A1* | 9/2003 | Steeber et al. ........ 198/370.01 |
| 2008/0093197 A1* | 4/2008 | Spencer ................... 198/445 |

FOREIGN PATENT DOCUMENTS

| | | |
|---|---|---|
| DE | 2618905 A1 | 11/1977 |
| DE | 3034381 A1 | 4/1981 |
| DE | 202004016069 U1 | 12/2005 |
| EP | 0259650 A2 | 3/1988 |
| EP | 0635414 A1 | 1/1995 |
| FR | 2218191 A1 | 9/1974 |
| FR | 2766803 A1 | 2/1999 |
| JP | S5953315 A | 3/1984 |
| WO | 0043294 A1 | 7/2000 |
| WO | 2004076315 A2 | 9/2004 |

OTHER PUBLICATIONS

International Search Report and Written Opinion from the European Patent Office mailed Sep. 5, 2007 for corresponding International Application No. PCT/NL2007/050174, filed Apr. 20, 2007.

International Search Report mailed Jul. 20, 2000 for corresponding International Application No. PCT/US00/12958, filed May 12, 2000.

* cited by examiner

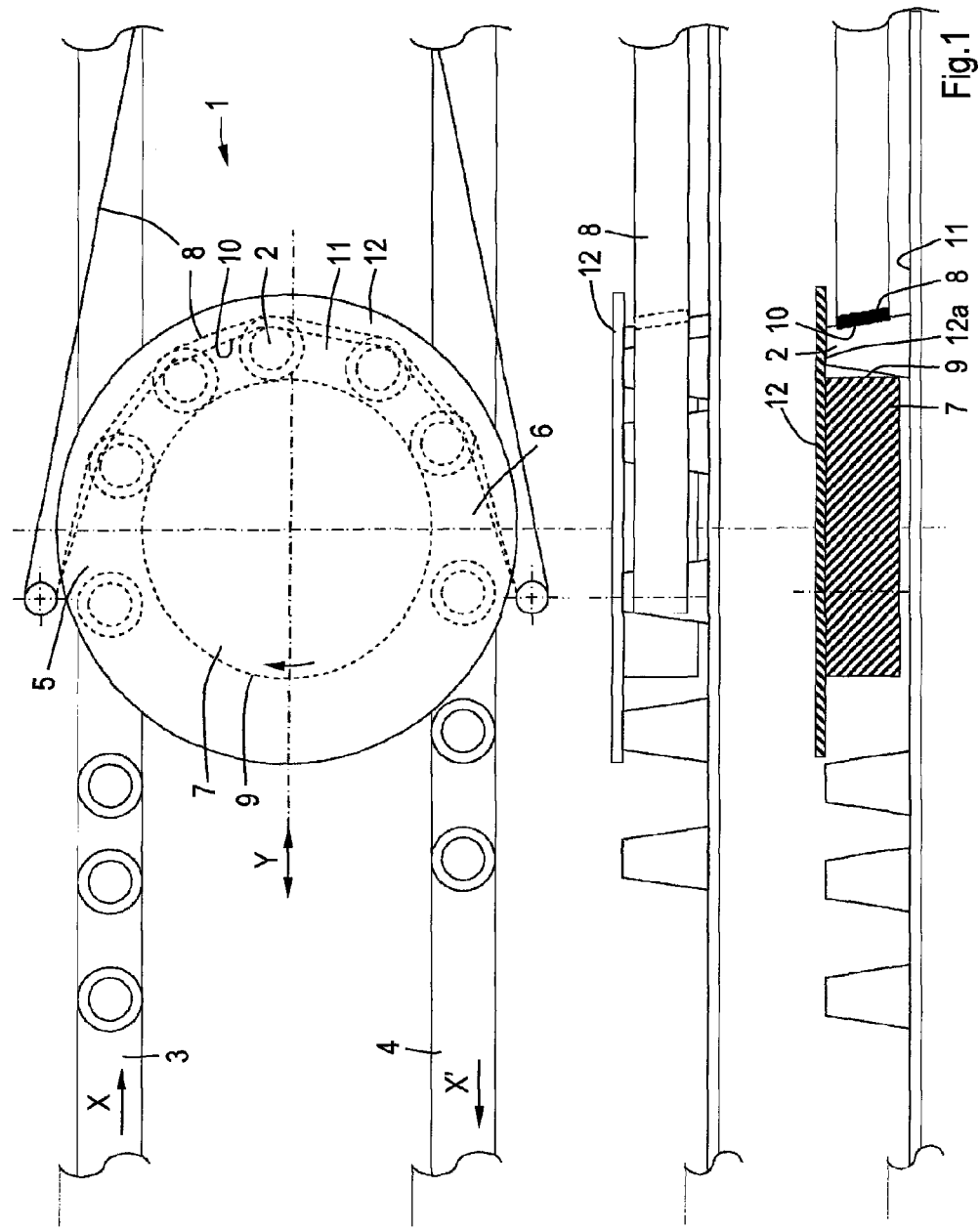

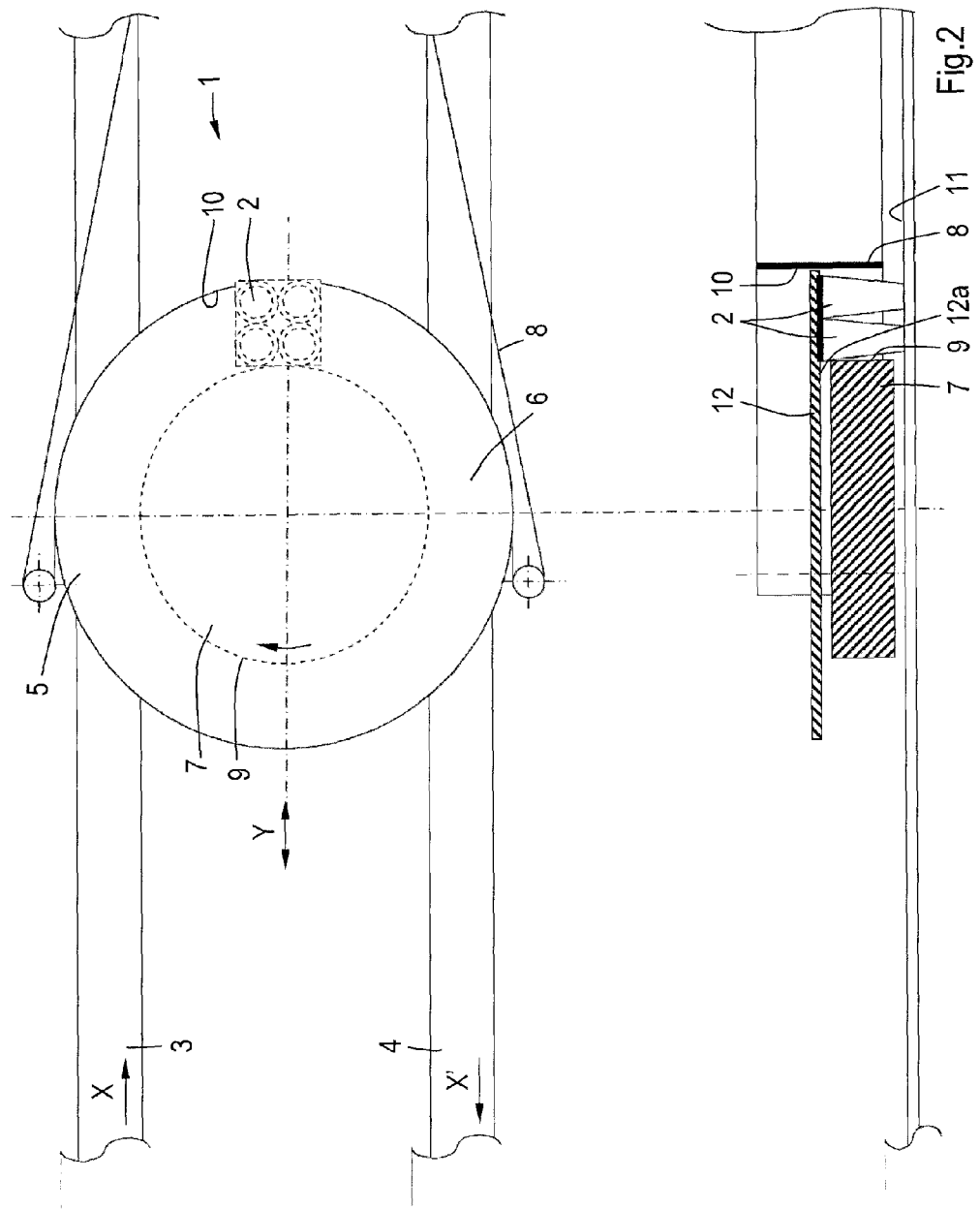

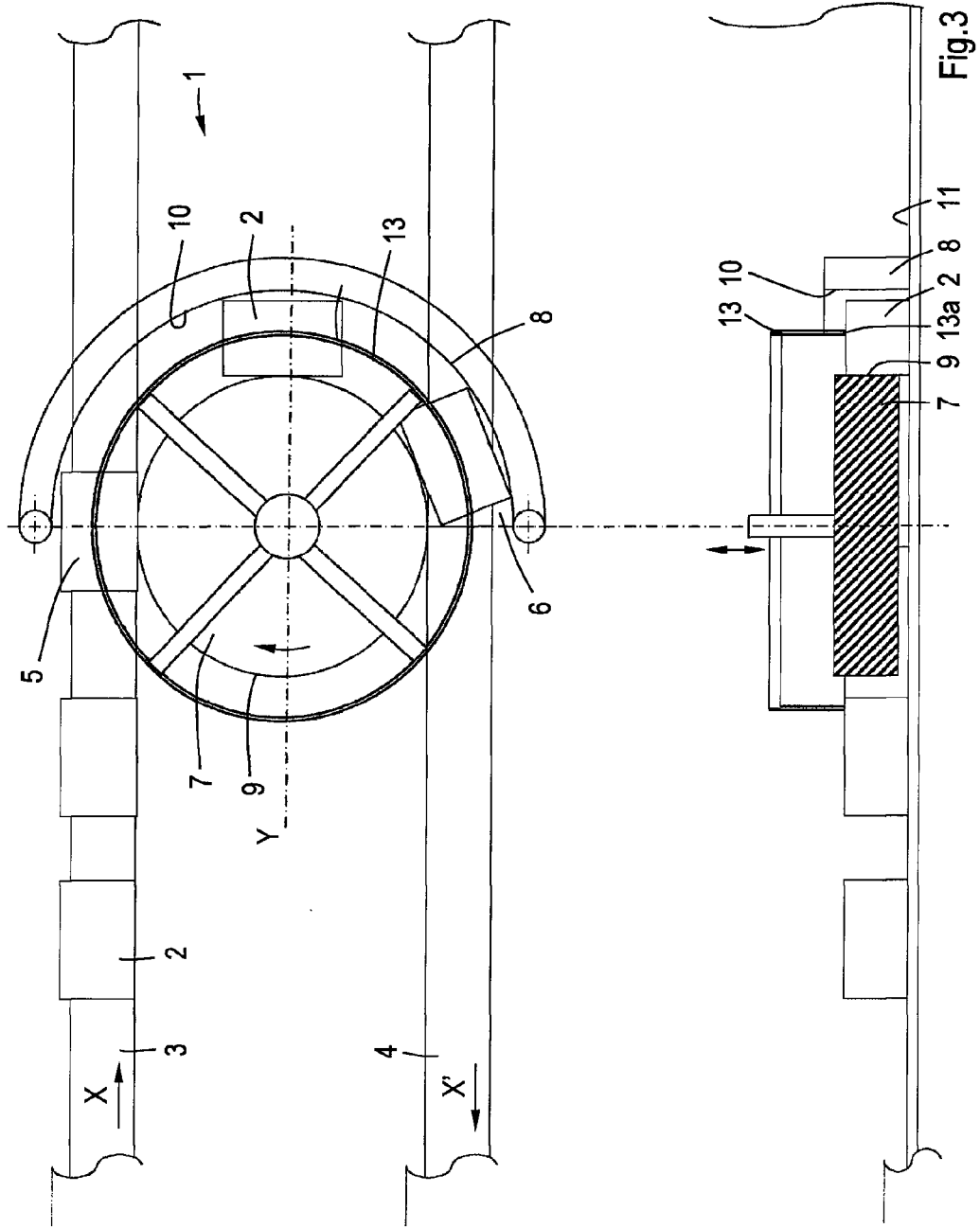

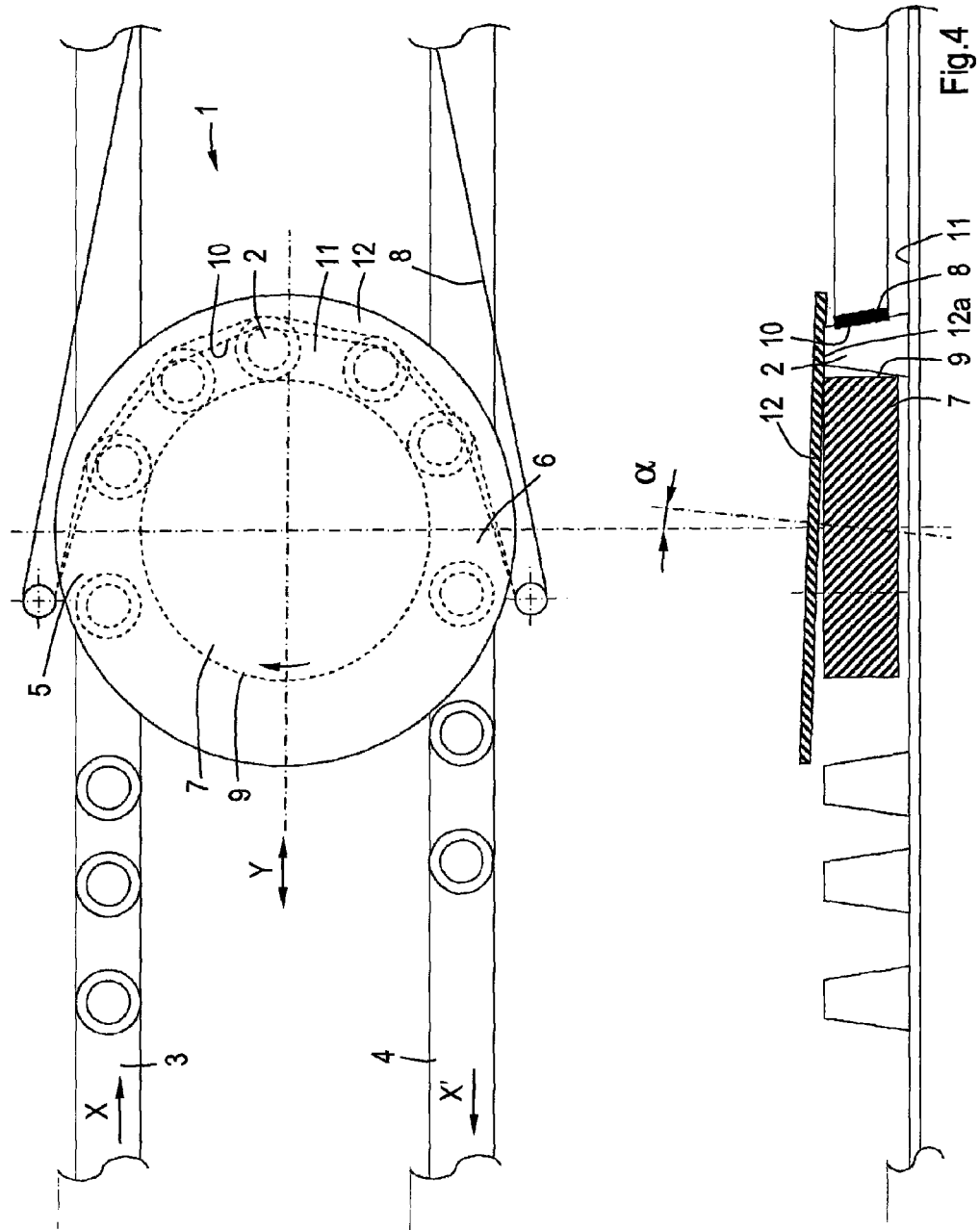

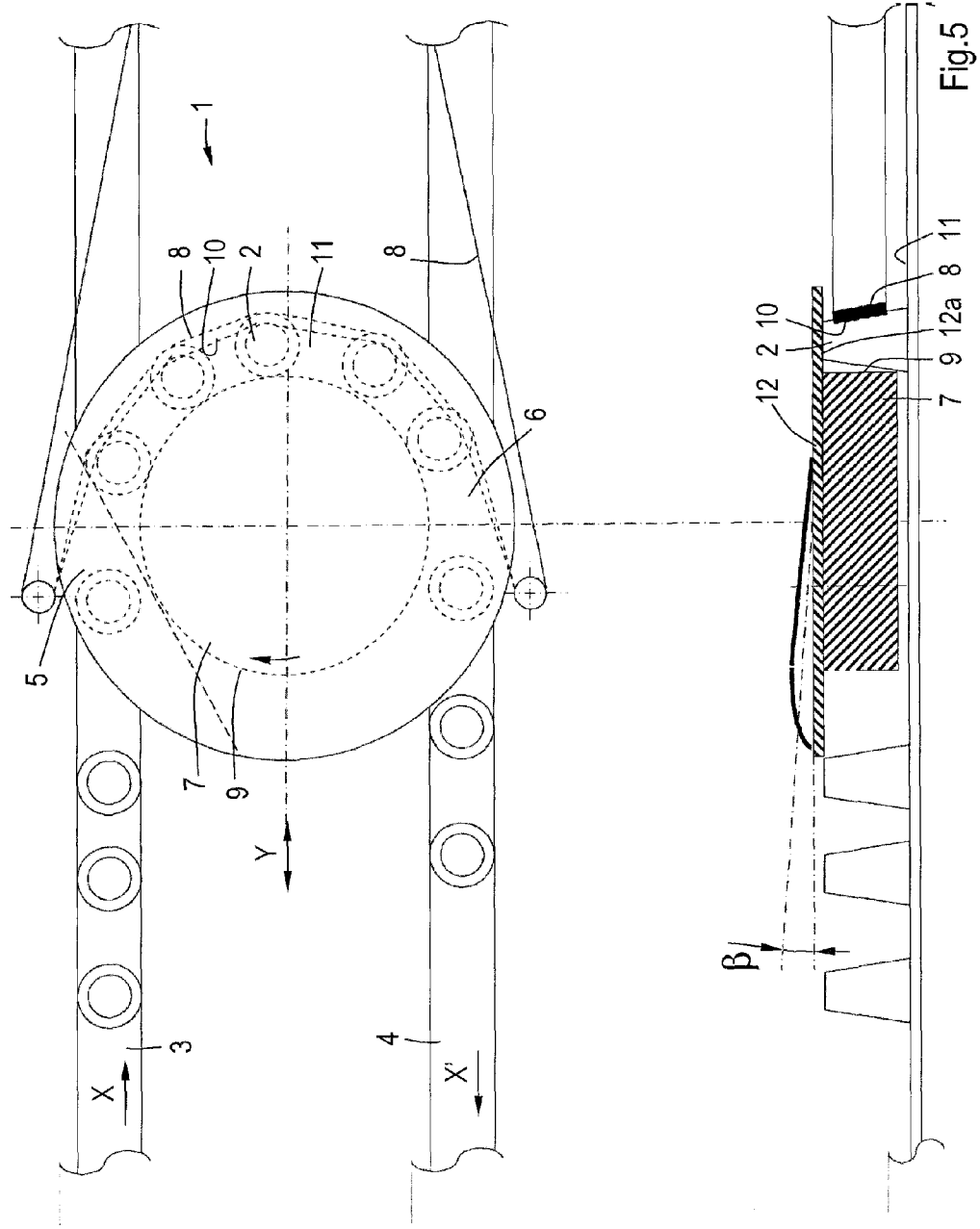

TRANSFER CONVEYOR AND A CONVEYING SYSTEM

CROSS-REFERENCE TO RELATED APPLICATION

This application is a Section 371 National Stage Application of International Application PCT/EP2011/072216 filed Dec. 8, 2011 and published as WO/2012/076659 A1 in English.

BACKGROUND

The discussion below is merely provided for general background information and is not intended to be used as an aid in determining the scope of the claimed subject matter.

Aspects of the present invention relate to a transfer conveyor for transferring articles from a first conveyor to a second conveyor.

A disadvantage of a known transfer conveyor is that it is less suitable for transferring deformable articles.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A transfer conveyor provides the opportunity to clamp a deformable article between first and second contact surfaces whereas a counter member avoids the article from being deformed in a vertical direction. In case the first and second contact surfaces and/or the walls of the article to be engaged by the first and second contact surfaces are not parallel, the counter member prevents the article from being moved in the vertical direction with respect to the first and second contact surfaces or prevents at least one of the first and second contact members from being moved in the vertical direction. The counter member may be called an abutment member since the article abuts against it when it is clamped between the first and second contact members. It is also possible that at least one of the first and second contact members abuts against the counter member or abutment member in case the article does not or limitedly deform, but the first and/or second contact member tends to displace in the vertical direction when an article is clamped, for example due to the shape of the article and/or the flexibility of the first and/or second contact member.

In a practical embodiment the counter member or abutment member has a counter member contact surface for holding-up an article in an upward direction, which counter member contact surface is directed downwardly. A supporting element for supporting articles may be present between the input and the output; in that case the counter member is located above the supporting element. This means that the articles are supported by the supporting element during transfer, whereas the upper side of the articles may abut against the counter member. In practice the supporting element may be a smooth plate on which the articles can easily glide. In case the supporting element is absent the counter member holds up the article by a downward force on the article acting against the clamping force of the first and second contact surfaces on the article.

The counter member may be displaceable with respect to the first and second contact surfaces in the vertical direction. In this case the position of the counter member can be adjusted to the height of the articles.

In a specific embodiment the transport path between the input and the output is a partly circular path. The advantage of a partly circular path is that the transfer conveyor can be used for a first and second conveyor which have different conveying directions at the input and the output. In practice, a semi-circular path is advantageous since this provides the opportunity to apply the transfer conveyor for a first and second conveyor that extend parallel to each other and which have opposite conveying directions. In this case the transfer conveyor may be movable parallel to and between the first and second conveyors.

Preferably, the distance between the first and second contact surfaces is substantially constant between the input and the output, since this allows to transport products which have a shape that deviates from a rotation symmetrical shape about a vertical center line, for example products that are oval or rectangular as seen from above. More generally, articles having a length/width ratio smaller than one are sensitive to non-equal distances between the first and second contact surfaces under clamping conditions and may easily be rotated if the distance suddenly changes during transferring, wherein the length is measured in conveying direction and the width in a direction perpendicular thereto.

The first contact surface may comprise a circular portion between the input and the output, and the second contact member may comprise a flexible belt which is guided substantially parallel to the circular portion so as to form the second contact surface. In this embodiment the articles can be clamped against the first contact member by the flexible belt. In particular in case of articles which have large widths with respect to their lengths and which have large widths with respect to the radius of the circular portion, it is desired to have a constant distance between the first and second contact surface, because under these conditions the articles tend to be thrown away if the flexible belt and the first contact surface varies near the output due to the biased belt.

The first contact surface may be formed by the circumference of a drivable wheel and/or the flexible belt is drivable. If both the wheel and the belt are drivable the slip between the articles and the first and second contact members will be minimized.

It is noted that the belt may be formed by a flexible strip, a chain of slats or the like. In case of a chain of slats the chain can be guided along a curved path, whereas the slats may be flexible, for example flaps of a rubber compound suspending from the chain. This provides the opportunity to guide the slats along a partly circular path and convey non-cylindrical articles in a stable way between the input and the output.

The counter member may include a circular portion at least between the inlet and the outlet. This provides the opportunity to create additional functions for the counter member.

For example, the flexible belt is guided by the circular portion of the counter member between the input and the output. The advantage of this embodiment is that the distance between a circular portion of the first contact surface and the second contact surface can be kept constant.

More specifically the counter member may be a drivable disk which has a circumference along which the flexible belt is guided. In this case the belt may be driven by the disk, as well, but this is not necessary. It is also conceivable that in case the first contact member is a rotatable wheel the disk is attached to the first contact member in order to be rotated at the same speed.

In a particular embodiment the counter member is located above the second contact member in order to prevent the second contact member from displacing in an upward direction. For example, if the second contact member is a flexible belt as described above and the articles are tapered in the upward direction the belt may tend to move upwardly and is hold up by the counter member.

In an alternative embodiment the counter member comprises a wheel rim which extends between and substantially parallel to the first and second contact surfaces. The rim can hold up a product from moving upwardly between the first and second contact surface upon clamping. It is also conceivable that the rim is pressed onto the article if the article tends to deform in a horizontal plane during travelling between the input and the output. This may be the case if the article is a package that contains products which are slidable with respect to each other, for example a package of candy bars. It is noted that in this case it is not necessary to clamp the articles between the first and second contact members. More generally, in another aspect the transfer conveyor for transferring articles from a first conveyor to a second conveyor may comprise:

an input for receiving articles from the first conveyor and an output for transporting articles to the second conveyor, a curved transport path between the input and the output including a supporting element for supporting articles, at least a guide surface extending upwardly at an outside bend of the transport path, a counter member for pressing downwardly on an article when travelling from the input to the output. In this embodiment the articles are not necessarily clamped in a horizontal direction when travelling from the input to the output. The counter member may clamp an article to the supporting element in vertical direction. This prevents the article from deformation due to collision against the guide surface when it enters the transfer conveyor at the input. The transfer conveyor according to this aspect may be provided with other technical features as mentioned hereinbefore and hereinafter, for example the counter member may be displaceable in a vertical direction, it may be a drivable disk or formed by a wheel rim, the guide surface may be formed by a flexible belt, or the like.

It is advantageous when at least at the input the distance between the counter member and the first and second contact surfaces reduces in the direction from the input to the output. In case of presence of the supporting element the distance between the counter member and the supporting element may be reduced at the input, as seen in the direction from the input to the output. This provides the opportunity to easily receive an article at the input and than pressing the counter member onto the article. At the output the mentioned distances may increase, as seen in the direction from the input to the output. Preferably, the course of the increase and/or decrease is gradual to avoid sudden disturbances to the articles.

The counter member may be drivable and provided with engaging elements for engaging articles. For example, the counter member may be made of a resilient material that forms a protrusion behind an article upon clamping the counter member onto the article such that the article is pushed by the protrusion when driving the counter member. Alternatively, the counter member may be provided with bendable pins are hairs suspending from the counter member and having a certain stiffness to push against an article when being present behind an article and having a certain flexibility to bend when being present above an article and pressed downwardly onto the article by the counter member.

An aspect of the invention also relates to a conveying system comprising a first conveyor and a second conveyor which extend substantially parallel to each other and have opposite transport directions, and a transfer conveyor as described hereinbefore which is movable between and along the first and second conveyor for transferring articles from the first conveyor to the second conveyor.

BRIEF DESCRIPTION OF THE DRAWINGS

The invention will hereafter be further explained with reference to the drawings showing embodiments of the transfer conveyor by way of example.

FIG. 1 is a very schematic top view, side view and cross-sectional view of an embodiment of the transfer conveyor.

FIG. 2 is a very schematic top view and cross-sectional view of an alternative embodiment.

FIGS. 3-5 are similar views as FIG. 2 of further alternative embodiments.

DETAILED DESCRIPTION OF THE ILLUSTRATIVE EMBODIMENT

FIG. 1 shows an embodiment of a transfer conveyor 1 for transferring articles 2 from a first conveyor 3 to a second conveyor 4. In this embodiment the first conveyor 3 and the second conveyor 4 extend parallel to each other and the conveying directions of the conveyors 3, 4 are opposite to each other, as indicated by arrows X, X'.

The transfer conveyor 1 is moveable along the first and second conveyors 3, 4, as indicated by the double-headed arrow Y. This provides the opportunity to transfer articles 2 from the first conveyor 3 to the second conveyor 4 at different locations along the conveyors 3, 4. In alternative embodiments the conveyors 3, 4 may have curved, ramped or helical tracks.

The transfer conveyor 1 comprises an input 5 for receiving the articles 2 from the first conveyor 3 and an output 6 for transporting the articles 2 to the second conveyor 4. The transfer conveyor 1 further comprises a first contact member formed by a drivable wheel 7 and a second contact member formed by a flexible belt 8. The flexible belt 8 is guided more or less concentrically about the wheel 7 via vertical rollers disposed at opposite sides of the wheel 7. The belt 8 is also drivable, but a drive and guide for driving and guiding the belt 8 are not shown in detail. The outer circumference of the wheel 7 comprises a first contact surface 9 and the belt 8 comprises a second contact surface 10. The first and second contact surfaces 9, 10 extend upwardly and face each other. Under operating conditions, an article 2 that is received at the input 5 is clamped between the first and second contact surfaces 9, 10 and travels from the input 5 to the output 6.

FIG. 1 shows that the articles 2 in this case are conical. The widest portions of the articles 2 are directed downwardly. The articles 2 rest on a supporting element 11 between the input 5 and the output 6. The supporting element 11 is a smooth plate in this case. Due to the conical shape of the articles 2 the flexible belt 8 is twisted between the input 5 and the output 6. It is noted that the supporting element 11 may be omitted.

Due to the conical shape of the articles 2 the belt 8 tends to move upwardly. Furthermore, since the first contact surface 9 in this embodiment extends substantially vertically the articles 2 tend to tilt towards the wheel 7. These effects are minimized or even eliminated by a counter member formed by a disk 12. The disk 12 prevents the article 2 from partly moving upwardly due to tilting and also prevents the belt 8 from moving upwardly when the article 2 is clamped between the wheel 7 and the belt 8. Therefore, in this embodiment the disk 12 is located above the belt 8 and adjusted to the height of the articles 2.

It is noted that the embodiment as shown in FIG. 1 is also suitable for transporting the conical articles 2 upside down. In this case the belt 8 tends to move downwardly but is held up by the supporting element 11, whereas tilting of the articles 2 in a direction from the wheel 7 to the belt 8 is avoided by the presence of the disk 12 against which a top side of the article 2 abuts. The disk 12 may have its own drive, but it may also be coupled to the drivable wheel 7.

FIG. 2 shows an alternative embodiment of the transfer conveyor 1. This embodiment also comprises a counter member formed by a disk 12. The article 2 as shown in FIG. 2 comprises four conical containers which are provided with a common cover. When such an article is clamped in horizontal direction it tends to deform due to displacement of the containers to each other, resulting in a height increase of the article 2. Such a deformation is avoided by the disk 12, because a downwardly directed counter member contact surface 12a of the disk 12 holds up the article 2.

Furthermore, the embodiment as shown in FIG. 2 also comprises a flexible belt 8, but in this case the belt 8 is guided along a circular portion of the circumference of the disk 12. The advantage of this embodiment is that the distance between the first and second contact surfaces 9, 10 is substantially constant between the input 5 and the output 6. The disk 12 may also drive the belt 8, but this is not necessary.

A constant distance between the first and second contact surfaces 9, 10 is typically advantageous for products that are not rotation symmetric about a center line that extends upwardly, for example oval containers. More in general the length of such articles as measured in the conveying direction is smaller than the width thereof as measured in a direction perpendicular thereto. Such articles tend to rotate between the input and the output if the distance changes. Furthermore, it is desired to have a constant distance between the first and second contact surface if the ratio between the radius of the circular portion and the width of the article, as measured along the radius, is relatively small, and the width of the article 2 with respect to its length in conveying direction is large, because in that case the articles 2 tend to be thrown away at the output 6 if the distance varies. For example, such articles have a length/width ratio smaller than one and a ratio between the radius of the circular portion and the width of the article 2 smaller than or equal to two. This may typically happen if the belt 8 deviates from a concentrical path about the wheel 7, but rather has a polygonal shape as seen from above.

It is noted that in an alternative embodiment there may be a distance between the disk 12 and the articles 2, for example in case of transporting articles 2 which are less sensitive to deformation upon clamping.

FIG. 3 shows another embodiment in which the counter member comprises a wheel rim 13 which is adapted to rest on an article 2. This embodiment is typically suitable for transferring block shaped articles 2 that contain separate products within a common package such as a package of cookie bars. The wheel rim 13 extends between the first and second contact surfaces 9, 10 and may keep the individual bars fixed to each other between the input 5 and the output 6. The wheel rim 13 is substantially parallel to the first and second contact surfaces 9, 10 and is displaceable in vertical direction. The latter feature provides the opportunity to easily adjust the transfer conveyor 1 for transporting articles 2 of different height and also to press the wheel rim 13 against the article 2.

In this case the wheel rim 13 is provided with a counter member contact surface 13a as illustrated in FIG. 3.

FIG. 4 shows an embodiment in which at the input 5 the distance between the supporting element 11 and the disk 12 reduces in the direction from the input 5 to the output 6. In this case this effect is achieved by tilting the center line of the disk 12 with respect to a vertical line about an angle α. It is noted that at the output 5 the distance between the supporting element 11 and the disk 12 increases in the direction from the input 5 to the output 6. In FIG. 5 a comparable effect is achieved by means of a flexible disk 12 which is adapted such that a portion of the disk 12 is lifted before it arrives at the input 5 and goes down beyond the input. The angle of the lifted portion at the input 5 is indicated by 13 in FIG. 4.

It is noted that the embodiments as shown in FIGS. 2 and 3 and described hereinbefore, which have a substantially constant distance between the first and second contact surfaces 9, 10 along the transport path between the input 5 and the output 6, are also conceivable without the presence of a counter member or in which the counter member does not function as an abutment member for holding-up the articles in the vertical direction. In other words, the invention is also related to the following aspects:

Aspect 1: A transfer conveyor 1 for transferring articles 2 from a first conveyor 3 to a second conveyor 4 comprising:
  an input 5 for receiving articles 2 from the first conveyor 3 and an output 6 for transporting articles 2 to the second conveyor 4, and a curved transport path between the input 5 and the output 6,
  a first contact member 7 and a second contact member 8 having first and second contact surfaces 9, 10, respectively, extending upwardly and facing each other for clamping articles 2 between said contact surfaces 9, 10 when travelling from the input 5 to the output 6,
  wherein the distance between the first and second contact surfaces 9, 10 is substantially constant between the input 5 and the output 6.

This embodiment is typically suitable for products of which the shape hardly changes or does not change when being clamped, but are non-cylindrical as seen from above. Possible problems of transferring such articles if the distance between the contact surfaces 9, 10 changes, are explained hereinbefore.

Aspect 2: A transfer conveyor 1 according to aspect 1, wherein at least one of the first contact member 7 and the second contact member 8 is drivable for transporting articles 2 from the input 5 to the output 6.

Aspect 3: A transfer conveyor according to aspect 1 or 2, wherein the first contact member 7 and/or the second contact member 8 is/are provided with a resiliency for creating a clamping force between the contact surfaces 9, 10.

Aspect 4: A transfer conveyor according to one of the preceding aspects, wherein at least one of the contact surfaces 9, 10 is made of a soft material.

Aspect 5: A transfer conveyor 1 according to one of the preceding aspects, wherein the transport path between the input 5 and the output 6 is a partly circular path, preferably a semicircular path.

Aspect 6: A transfer conveyor 1 according to one of the preceding aspects, wherein the first contact surface 9 comprises a circular portion between the input 5 and the output 6 and the second contact member comprises a flexible belt 8 which is guided substantially parallel to the circular portion so as to form the second contact surface 10.

Aspect 7: A transfer conveyor 1 according to aspect 6, wherein the first contact surface 7 is formed by the circumference of a drivable wheel 7 and/or wherein the flexible belt 8 is drivable.

Aspect 8: A transfer conveyor 1 according to aspect 7, wherein the flexible belt comprises a chain of flexible slats, wherein the slats may be flaps of a rubber compound suspending from the chain. More specifically, the slats may be so-called hold down flaps. Due to the flexibility of the belt 8 collision of articles 2 against the second contact surface 10 at the input 5 is damped. In this case the circumference of the drivable wheel 7 may be rigid, for example.

From the foregoing it will be clear that the invention provides a transfer conveyor which is suitable for transferring articles having a great variety of shapes.

The invention is not restricted to the above-described embodiments, which can be varied in a number of ways within the scope of the claims. For instance, the wheel, disk and belt are all drivable in the embodiments as shown, but it is also conceivable to drive only one or two of these parts.

The invention claimed is:

1. A transfer conveyor for transferring articles from a first conveyor to a second conveyor comprising:
   an input configured to receive articles from the first conveyor and an output configured to transport articles to the second conveyor, and a curved transport path between the input and the output,
   a first contact member and a second contact member having first and second contact surfaces, respectively, extending upwardly and facing each other configured to clamp articles between said contact surfaces when travelling from the input to the output,
   a counter member configured to control movement of an article and/or at least one of the first and second contact members in a vertical direction when an article is clamped by the contact members,
   wherein at least one of the first contact member, the second contact member and the counter member is drivable for transporting articles from the input to the output, and
   wherein the counter member, the first contact member, and the second contact member are positioned such that under operating conditions at least one of the article, the first contact member, and the second contact member abuts against the counter member in the vertical direction upon clamping the article between the contact surfaces during traveling from the input to the output.

2. The transfer conveyor according to claim 1, wherein the counter member has a counter member contact surface configured to control movement of the article which counter member contact surface is directed downwardly.

3. The transfer conveyor according to claim 2, wherein the counter member is located above the second contact member.

4. The transfer conveyor according to claim 1, wherein the counter member is displaceable with respect to the first and second contact surfaces in the vertical direction.

5. The transfer conveyor according to claim 1, wherein the transport path between the input and the output is a partly circular path.

6. The transfer conveyor according to claim 1, wherein a distance between the first and second contact surfaces is substantially constant between the input and the output.

7. The transfer conveyor according to claim 1, wherein the first contact surface comprises a circular portion between the input and the output and the second contact member comprises a flexible belt which is guided substantially parallel to the circular portion so as to form the second contact surface.

8. The transfer conveyor according to claim 7, wherein the first contact surface is formed by the circumference of a wheel and/or wherein the flexible belt is driven.

9. The transfer conveyor according to claim 1, wherein the counter member includes a circular portion at least between the inlet and the outlet.

10. The transfer conveyor according to claim 9, wherein the second contact member is guided by the circular portion of the counter member between the input and the output.

11. The transfer conveyor according to claim 10, wherein the counter member is a disk having a circumference along which the second contact member is guided.

12. The transfer conveyor according to claim 1, wherein the counter member comprises a wheel rim which extends between and substantially parallel to the first and second contact surfaces.

13. The transfer conveyor according to claim 1, wherein at least at the input a distance between the counter member and the first and second contact surfaces reduces in the direction from the input to the output.

14. The transfer conveyor according to claim 1, wherein the counter member is provided with engaging elements configured to engage articles.

15. The transfer conveyor according to claim 1, wherein the counter member extends along more than 80% of the transport path between the input and the output.

16. The transfer conveyor according to claim 1, wherein at least the transport path between the input and the output extends substantially horizontally.

17. The transfer conveyor according to claim 1, wherein the transport path between the input and the output is a semi-circular path.

18. The transfer conveyor according to claim 1, wherein the counter member extends along more than 90% of the transport path between the input and the output.

19. The transfer conveyor of claim 1 wherein the counter member is configured to prevent movement of the article and/or the at least one of the first and second contact members in the vertical direction when the article is clamped by the contact members.

20. A conveying system comprising:
   a first conveyor and a second conveyor which extend substantially parallel to each other and have opposite transport directions, and
   a transfer conveyor which is movable between and along the first and second conveyor configured to transfer articles from the first conveyor to the second conveyor, the transfer conveyor comprising:
   an input configured to receive articles from the first conveyor and an output configured to transport articles to the second conveyor, and a curved transport path between the input and the output,
   a first contact member and a second contact member having first and second contact surfaces, respectively, extending upwardly and facing each other configured to clamp articles between said contact surfaces when travelling from the input to the output,
   a counter member configured to control movement of an article and/or at least one of the first and second contact members in a vertical direction when an article is clamped by the contact members,
   wherein at least one of the first contact member, the second contact member and the counter member is drivable for transporting articles from the input to the output, and
   wherein the counter member, the first contact member, and the second contact member are positioned such that under operating conditions at least one of the article, the first contact member, and the second contact member abuts against the counter member in the vertical direction upon clamping the article between the contact surfaces during traveling from the input to the output.

21. A transfer conveyor for transferring articles from a first conveyor to a second conveyor comprising:
   an input configured to receive articles from the first conveyor and an output configured to transport articles to the second conveyor, and a curved transport path between the input and the output,
   a first contact member and a second contact member having first and second contact surfaces, respectively, extending upwardly and facing each other configured to clamp articles between said contact surfaces when travelling from the input to the output,
   a counter member configured to control movement of an article and/or at least one of the first and second contact members in a vertical direction when an article is clamped by the contact members,
   wherein at least one of the first contact member, the second contact member and the counter member is drivable for transporting articles from the input to the output,
   wherein the transport path between the input and the output is a partly circular path, and
   wherein the counter member includes a circular portion at least between the inlet and the outlet.

22. The transfer conveyor of claim 21 wherein the counter member is configured to prevent movement of the article and/or the at least one of the first and second contact members in the vertical direction when the article is clamped by the contact members.

* * * * *